No. 805,397. PATENTED NOV. 21, 1905.
H. WILHELM.
COVER FOR MANHOLES.
APPLICATION FILED SEPT. 2, 1904.
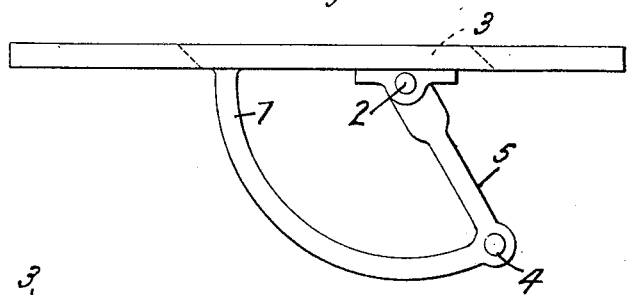
Fig. 1.
Fig. 3.
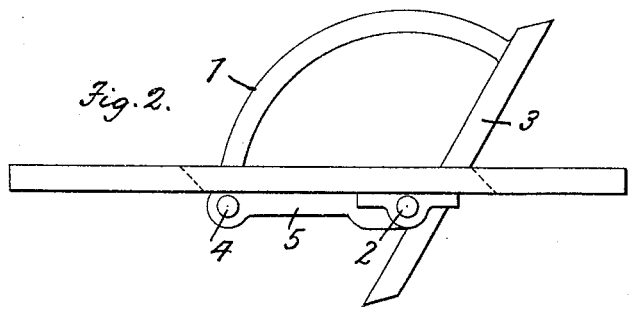
Fig. 2.
WITNESSES.
Grace Ogle.
Emily Knight.
INVENTOR
H. Wilhelm.

UNITED STATES PATENT OFFICE.

HEINRICH WILHELM, OF HANAU, GERMANY.

COVER FOR MANHOLES.

No. 805,397.　　　　Specification of Letters Patent.　　　　Patented Nov. 21, 1905.

Application filed September 2, 1904. Serial No. 223,149.

*To all whom it may concern:*

Be it known that I, HEINRICH WILHELM, a subject of the German Emperor, residing at 6 Brandenburgerstrasse, Pulverfabrik, near Hanau-on-the-Main, in the Empire of Germany, have invented certain new and useful Improvements Relating to Covers for Manholes, Shafts, and the Like, of which the following is a specification.

This invention relates to covers for manholes, shafts, and the like, especially where a smooth outer surface is required without preventing the easy manipulation of the cover.

In covers hitherto used the manipulation has frequently been difficult, while holes were necessitated in which mud and dirt fall and accumulate, so that considerable time is lost in cleaning the handle and removing the dirt before the cover can be removed. Moreover, an imperfect connection between the cover and the handle results, whereby the cover becomes so disposed that it can only with difficulty be replaced. These disadvantages have been considered in the construction of the apparatus which is the subject-matter of the present invention, and an apparatus has been produced which while providing an uninterrupted and continuous surface of the handle and cover permits of the easy manipulation of the cover. Moreover, the connection of the handle to the cover is such that the replacing of the cover can be readily effected.

In the drawings, Figures 1 and 2 show in elevation the handle and cover with the handle in the closed and open position, respectively, while Fig. 3 represents a cross-section of the member which closes the slot in the cover through which the handle is withdrawn.

As illustrated in the drawings, a handle 1 is provided in the form of a segment and is pivotally mounted on the under side of the cover. The cover is provided with a slot having inclined lateral and end faces to correspond to the inclined sides of the closing member 3 and the inclined end faces thereof. The handle 1 is integrally provided with a radial member 5, which in turn is integrally connected to the closing member 3, the parts 1, 3, and 5 being thus integral and pivoted upon the pivot-pin 2, carried in a bracket secured to the under side of the cover. A pin 4 limits the outward movement of the handle and serves, with the pivot-pin 2, to support the cover, so that it may be removed from its position and be replaced on being lifted by the centrally-disposed handle 1.

It will be understood that for the purpose of lifting the handle into position for moving the cover it is only necessary to press the extremity of the closing member 3 in the direction indicated by the arrow in Fig. 1, so that the front extremity is raised and can be easily held and drawn upwardly, so that the handle may be brought into position for use, as illustrated in Fig. 2. The weight of the cover on lifting the cover is equally disposed on the stop-pin 4 and pivot-pin 2, and the handle is immovable in relation to the cover, so that the latter may be exactly placed in its position. The handle resumes the position indicated in Fig. 1 on its release.

What I claim as my invention, and desire to secure by Letters Patent, is—

1. In manhole shaft and similar covers, the liftable cover-plate, a slot in said cover-plate, said slot being substantially centrally disposed in said cover-plate, a pivoted closing member for said slot, a handle connected to the normal under side of said pivoted closing member and so disposed that when the closing member is opened or uplifted the handle shall be substantially centrally disposed with respect to the cover-plate, substantially as described.

2. In manhole shaft and similar covers, the cover-plate, a slot in said cover-plate, a pivoted closing member for said slot, a handle connected to the normal under side of said pivoted closing member, said handle being of segmental form, and a stop carried at the extremity of said handle for engagement with the under side of said cover, substantially as described.

3. In manhole shaft and similar covers, the cover-plate, a slot in said cover-plate inclined lateral and end faces for said slot, a pivoted closing member for said slot, inclined lateral and end faces for said closing member corresponding to the lateral and end faces of said slot, and a handle connected on the normal under side of said closing member, substantially as described.

4. In manhole shaft and similar covers, the liftable cover-plate, a slot in said cover-plate, said slot being substantially centrally disposed in said cover-plate, a closing member for said slot, said closing member being pivoted near its end, and a handle connected on the normal under face of said closing member, and so disposed that when the closing member is opened or uplifted the handle shall be substantially centrally disposed with respect to the cover-plate, substantially as described.

5. In manhole shaft and similar covers, the cover-plate, a slot in said cover-plate, a closing member for said slot, said closing member being pivoted near its end, a handle connected on the normal under face of said closing member, said handle being of segmental form, and a stop carried at the extremity of said handle for engagement with the under side of said cover, substantially as described.

6. In manhole shaft and similar covers, the cover-plate, a slot in said cover-plate, inclined lateral and end faces for said slot, a pivoted closing member for said slot, inclined lateral and end faces for said closing member corresponding to the lateral and end faces of said slot, a handle connected on the normal under side of said closing member, said handle being of segmental form, and a stop carried at the extremity of said handle for engagement with the under side of said cover, substantially as described.

7. In manhole shaft and similar covers, the liftable cover-plate, a slot in said cover-plate, said slot being substantially centrally disposed in said cover-plate, a pivoted closing member for said slot, said closing member having a top face normally flush with the top face of said cover, and a handle connected to the normal under side of said pivoted closing member, and so disposed that when the closing member is opened or uplifted the handle shall be substantially centrally disposed with respect to the cover-plate, substantially as described.

8. In manhole shaft and similar covers, the cover-plate, a slot in said cover-plate, a pivoted closing member for said slot, a handle connected to the normal under side of said pivoted closing member, and a radial member connecting the lower extremity of the handle to the under side of the closing member, and a stop carried by the lower extremity of said handle for engagement with the under side of the said cover-plate substantially as described.

In testimony whereof I have signed my name to this specification in the presence of two subscribing witnesses.

HEINRICH WILHELM.

Witnesses:
CARL BUCKMÜLLER,
JEAN GRUND.